US011657318B2

(12) United States Patent
Sucan et al.

(10) Patent No.: US 11,657,318 B2
(45) Date of Patent: May 23, 2023

(54) ASSESSING RIDE QUALITY FOR AUTONOMOUS VEHICLES

(71) Applicant: Waymo LLC, Mountain View, CA (US)

(72) Inventors: Ioan-Alexandru Sucan, Mountain View, CA (US); Fang Da, Sunnyvale, CA (US); Poonam Suryanarayan, San Francisco, CA (US); Nathaniel Fairfield, Mountain View, CA (US); Yutaka Leon Suematsu, Mountain View, CA (US); Omer Baror, Mountain View, CA (US); Jian Leong, Mountain View, CA (US); Michael Epstein, Danville, CA (US)

(73) Assignee: Waymo LLC, Mountain View, CA (US)

( * ) Notice: Subject to any disclaimer, the term of this patent is extended or adjusted under 35 U.S.C. 154(b) by 1188 days.

(21) Appl. No.: 16/214,991

(22) Filed: Dec. 10, 2018

(65) Prior Publication Data

US 2020/0125989 A1    Apr. 23, 2020

Related U.S. Application Data

(60) Provisional application No. 62/747,815, filed on Oct. 19, 2018.

(51) Int. Cl.
*G06N 20/00* (2019.01)
*B60W 50/00* (2006.01)
*G05D 1/02* (2020.01)

(52) U.S. Cl.
CPC ......... *G06N 20/00* (2019.01); *B60W 50/0098* (2013.01); *G05D 1/0276* (2013.01); *G05D 2201/0213* (2013.01)

(58) Field of Classification Search
CPC .... G06N 20/00; G06N 3/0445; G06N 3/0454; G06N 3/08; B60W 50/0098;
(Continued)

(56) References Cited

U.S. PATENT DOCUMENTS 8,457,827 B1 * 6/2013 Ferguson .............. B60W 30/16
                                                    701/28
10,019,011 B1    7/2018 Green et al.
(Continued)

FOREIGN PATENT DOCUMENTS

JP      2008120271        5/2008
WO    2018139993 A1    8/2018

OTHER PUBLICATIONS

International Search Report and Written Opinion for Application No. PCT/US2019/055161 dated Jan. 23, 2020.
(Continued)

*Primary Examiner* — Alan D Hutchinson
(74) *Attorney, Agent, or Firm* — Botos Churchill IP Law

(57) ABSTRACT

The disclosure relates to training models for identification of events likely to cause discomfort to passengers of autonomous vehicles and for assessment of overall ride quality of autonomous vehicle rides. For instance, ride data may be associated with a ride quality value indicative of a level of discomfort and/or a first overall ride quality value indicating an overall ride quality provided by the passenger for the first ride. This ride data may be used to train a model such that the model is configured to, in response to receiving ride data for a second ride as input, output a list of events likely to cause discomfort to a passenger during the second ride and/or such that the model is configured to, in response to receiving second ride data for a second ride as input, output a second overall ride quality value for the second ride.

19 Claims, 11 Drawing Sheets

(58) Field of Classification Search
CPC ..... B60W 2540/215; B60W 60/00253; B60W 40/09; G05D 1/0276; G05D 2201/0213; G06Q 30/0278; G08G 1/202
See application file for complete search history.

(56) References Cited

U.S. PATENT DOCUMENTS

| | | |
|---|---|---|
| 10,107,635 B2 | 10/2018 | Larner et al. |
| 10,346,888 B2 | 7/2019 | Nix et al. |
| 10,703,385 B2 | 7/2020 | Shannon et al. |
| 2007/0124029 A1 | 5/2007 | Hattori et al. |
| 2017/0203766 A1 | 7/2017 | Prokhorov |
| 2017/0305434 A1* | 10/2017 | Ratnasingam ......... G06N 20/00 |
| 2018/0229723 A1 | 8/2018 | Jiang et al. |
| 2018/0275667 A1* | 9/2018 | Liu .................... B60W 50/029 |
| 2019/0225232 A1 | 7/2019 | Blau |

OTHER PUBLICATIONS

The Extended European Search Report for European Patent Application No. 19873103.6, dated Apr. 28, 2022.

* cited by examiner

1100

ASSESSING RIDE QUALITY FOR AUTONOMOUS VEHICLES

CROSS-REFERENCE TO RELATED APPLICATIONS

The present application claims the benefit of the filing date of U.S. Provisional Patent Application No. 62/747,815, filed Oct. 19, 2018, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location. When a person (or user) wants to be physically transported and/or to transport goods between two locations via a vehicle, they may use any number of taxi or delivery services. To date, these services typically involve a human driver who is given dispatch instructions to a location to pick up and drop off the user and/or goods. In some instances, a passenger is provided with an opportunity to "rate" his or her overall experience with the ride service, for instance, by providing a tip to the driver and/or star or other rating.

BRIEF SUMMARY

One aspect of the disclosure provides a method of training a model for identification of events likely to cause discomfort to passengers of autonomous vehicles. The method includes receiving, by one or more server computing devices, first ride data identifying output from a planner system and output from a perception system. The first ride data is associated with a ride quality value indicating a level of discomfort identified by a passenger of the autonomous vehicle during a first ride. The method also includes training, by the one or more server computing devices, the model using the first ride data and any associated ride quality values such that the model is configured to, in response to receiving second ride data for a second ride as input, output a list of events that occur in the second ride that are likely to cause discomfort to one or more passengers during the second ride.

In one example, the method also includes inputting the second ride data for the second ride into the model in order to determine the list of events and flagging the second ride data for review based on the list of events. In one example, the second ride data corresponds to simulated ride data for a simulated ride generated using autonomous vehicle control software. In another example, the ride quality value is further associated with a point in time during the first ride. In another example, the ride data further includes context from a map used to control the autonomous vehicle during the first ride. In this example, the ride data further includes information about the locations and types of road users other than the vehicle. In another example, the ride data further includes acceleration information for the first ride. In this example, the ride data further includes derivative of acceleration information for the autonomous vehicle for the first ride.

Another aspect of the disclosure provides a method of training a model for assessment of overall ride quality of autonomous vehicle rides. The method includes receiving, by one or more server computing devices, first ride data identifying output from a planner system and output from a perception system. The first ride data is associated with a first overall ride quality value indicating an overall ride quality provided by a passenger of the autonomous vehicle for a first ride. The method also includes training, by the one or more server computing devices, the model using the first ride data and first overall ride quality value such that the model is configured to, in response to receiving second ride data for a second ride as input, output a second overall ride quality value for the second ride.

In one example, the second ride data corresponds to simulated ride data for a simulated ride generated using autonomous vehicle control software. In another example, the first ride data further includes context from a map used to control the autonomous vehicle during the first ride. In another example, the ride data further includes information about the locations and types of road users other than the vehicle. In another example, the first ride data further includes acceleration information for the autonomous vehicle. In another example, the method also includes receiving, output from a second model identifying a list of events likely to cause discomfort to a passenger during the first ride, and wherein the training is further based on the list of events. In another example, the method also includes, converting a first ride quality value to the first overall ride quality value, and the first ride quality value corresponds to a star rating for the first ride provided by the passenger. In another example, the model is a convolutional neural net over time in order to enable the model recognize relationships between events and when those events occur during a ride and how those relationships affect overall ride quality. In another example, the method also includes inputting the ride data for the second ride into the model in order to determine the second overall ride quality value and flagging the second ride data for review based on the second overall ride quality value. In another example, the method also includes inputting the ride data for the second ride into the model in order to determine the second overall ride quality value and using the second overall ride quality value to assess ride quality of a plurality of miles driven by autonomous vehicles. In another example, the method also includes inputting the ride data for the second ride into the model in order to determine the second overall ride quality value and using the second overall ride quality value to assess ride quality of a certain type of maneuver. In this example, the certain type of maneuver includes left or right turns. Alternatively, the certain type of maneuver includes lane changes.

DETAILED DESCRIPTION

Overview

Figure 1:
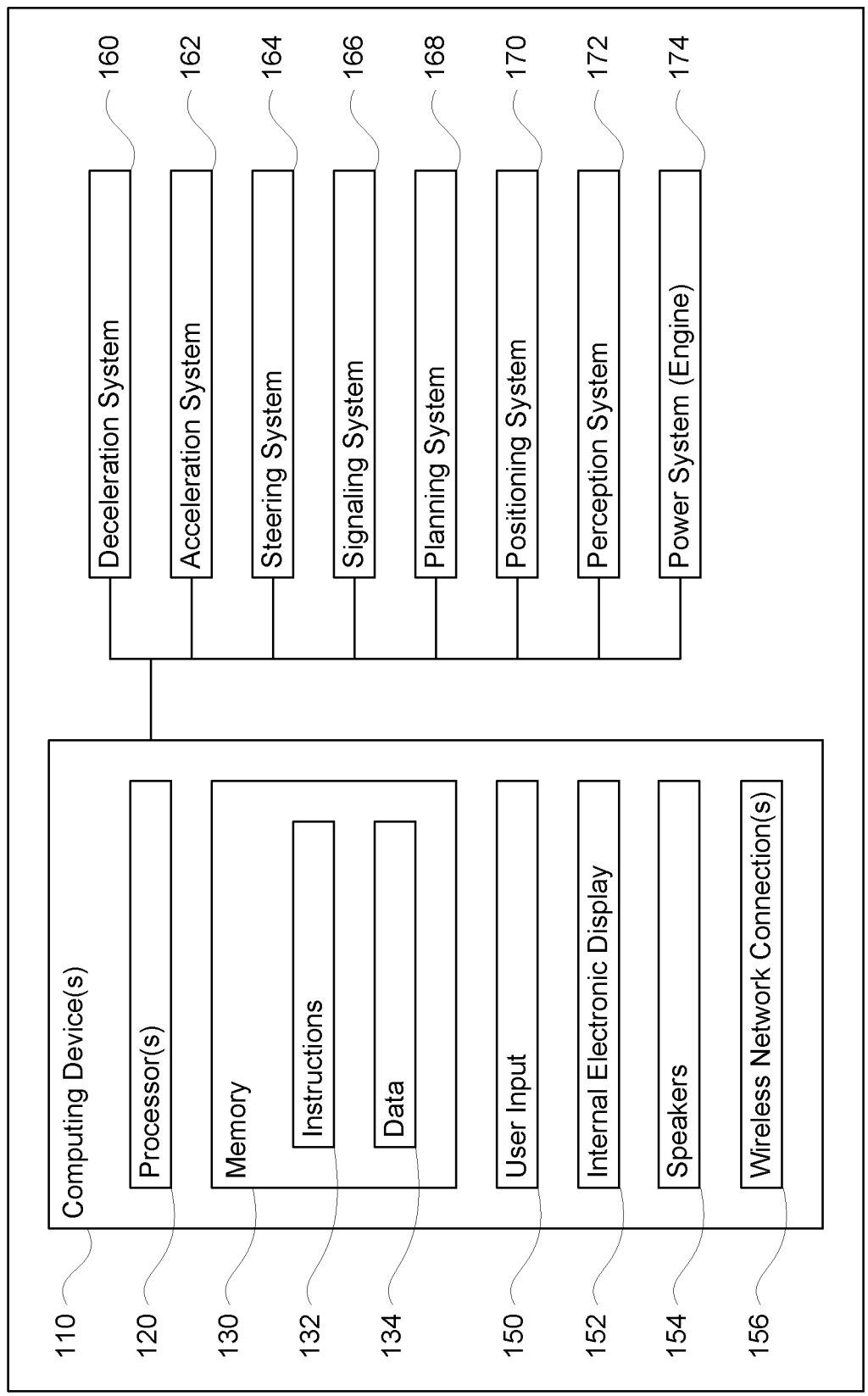
FIG. 1 is a functional diagram of an example vehicle in accordance with an exemplary embodiment.

The technology relates to assessing ride quality during simulations. In order to do so, one or more models can be trained using feedback provided by actual passengers during actual rides as well as log data including output from various system of the vehicle, such as the planner and perception systems, from these rides. As a result, the models may be trained to input the log data, identify individual events which may detract from ride quality, and provide a ride quality value for both real-world and simulated ride data. This information may then be used to assess ride quality across different facets of rides as well as to improve that software, and also to predict user retention rates in view of low quality rides.

In order to train the models, data must first be collected regarding ride quality. For instance, during trips or rides with human riders, such as actual passengers or test riders, these riders may be provided with the ability to provide real time feedback about a ride. As an example, a passenger may be able to provide feedback during a ride, for instance, in response to a particular event and/or to provide feedback for a ride as a whole, for instance, an overall rating for a ride.

A first model may be trained using ratings and associated ride data for a plurality of rides by test riders in order to identify a list of events likely to be uncomfortable for passengers as well as a level of such discomfort for each event in the list. The first model may then be used to detect uncomfortable events from ride data for different rides. For instance, ride data from simulated rides may be input into the model in order to provide ride quality assessments (i.e. a list of events likely to be uncomfortable as well as a level of discomfort for each event) for a given autonomous vehicle control software version and simulation. Similarly, ride data from actual passenger rides may be input into the model in order to provide ride quality assessments for a particular ride. This in turn, can be used to make adjustments to the software in order to improve ride quality overall and/or for a particular passenger.

A second model may be trained using the ratings and associated ride data for a plurality of rides by passengers in order to identify an overall ride quality value. In addition, to better inform the second model, identification of uncomfortable events during rides (i.e., the output of the first model) may be used to train the second model. The second model may also be trained using additional information from the passengers such as information about whether a passenger no longer takes rides (i.e., attrition) and/or reported motion sickness during a ride.

The second model may also be used to determine overall ride quality for real-world and simulated rides. For instance, output of the second model may be used to assess what types of events are likely to cause loss of passengers in order to try to fix such issues and prioritize engineering work to make adjustments to the software in order to improve ride quality over all. The overall ride quality data may be used to make assessments of the autonomous vehicle software and/or service overall.

The features described herein may thus allow for the detection of uncomfortable events and assessment of overall ride quality both in real-world and simulated ride. This, in turn, allows for the prioritization of engineering work to make improvements to the autonomous vehicle software, change ride behaviors in order to increase ridership retention and avoid loss of riders, as well as to provide for intervention when uncomfortable events occur.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, positioning system 170, perception system 172, and power system 174 (i.e. the vehicle's engine or motor) in order to control the movement, speed, etc. of vehicle 100 in accordance with the instructions 134 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route to a location. For instance, the planning system may periodically generate trajectories in order to follow a particular route to a destination. In this regard, the planning system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
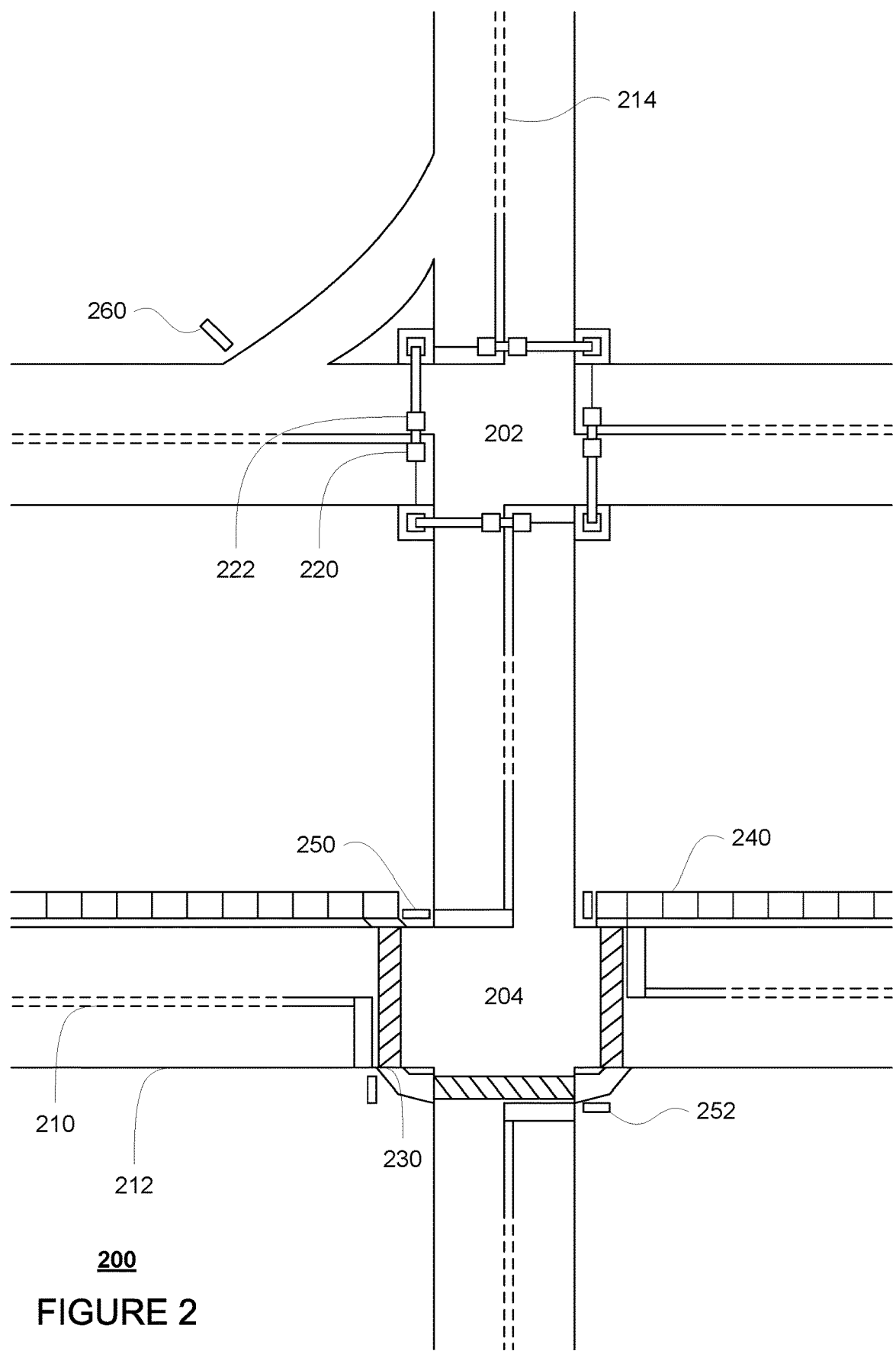
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic light signal lights 220, 222, crosswalk 230, sidewalks 240, stop signs 250, 252, and yield sign 260. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
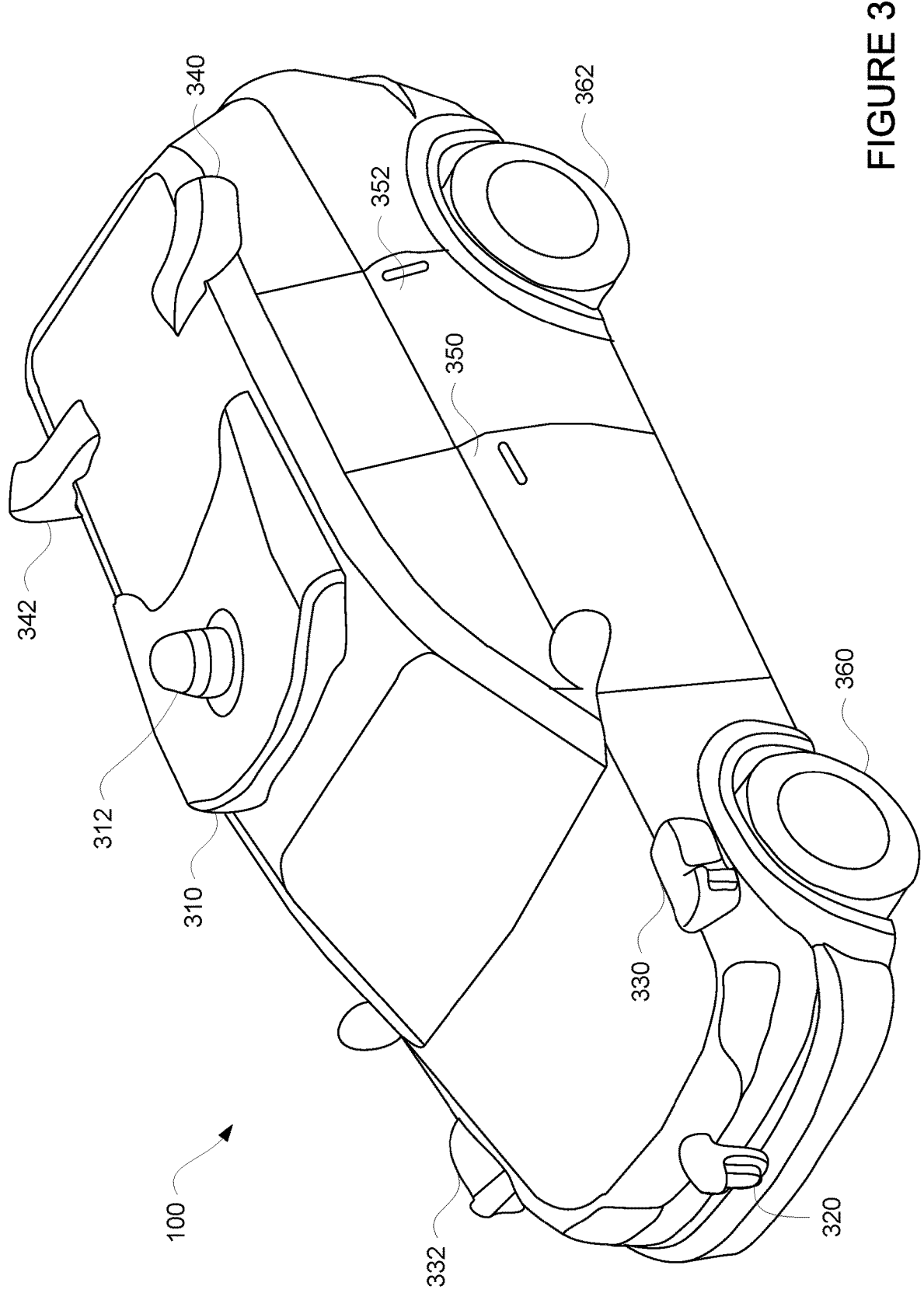
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 160. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
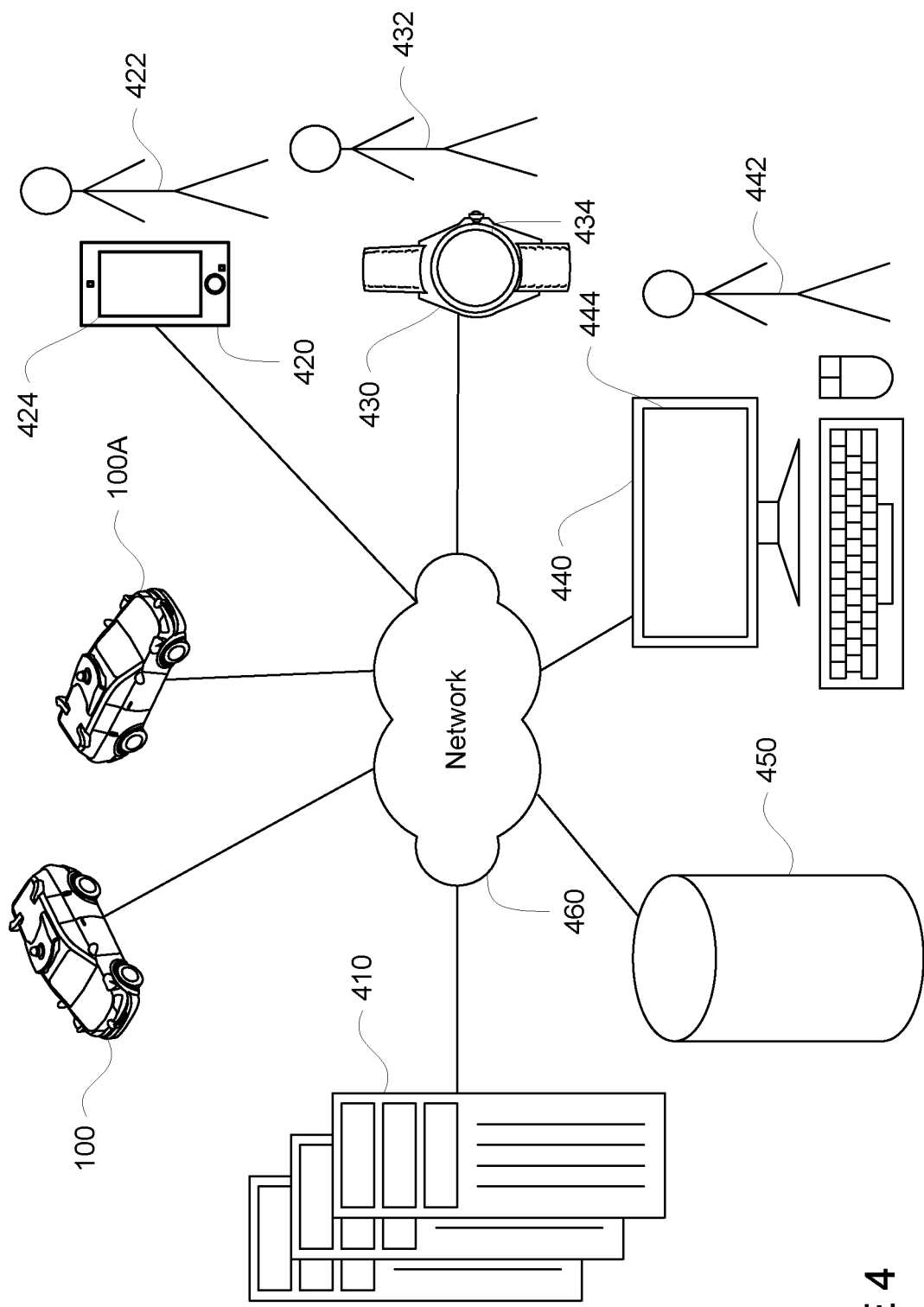
FIG. 4 is a pictorial diagram of an example system in accordance with aspects of the disclosure.
Figure 5:
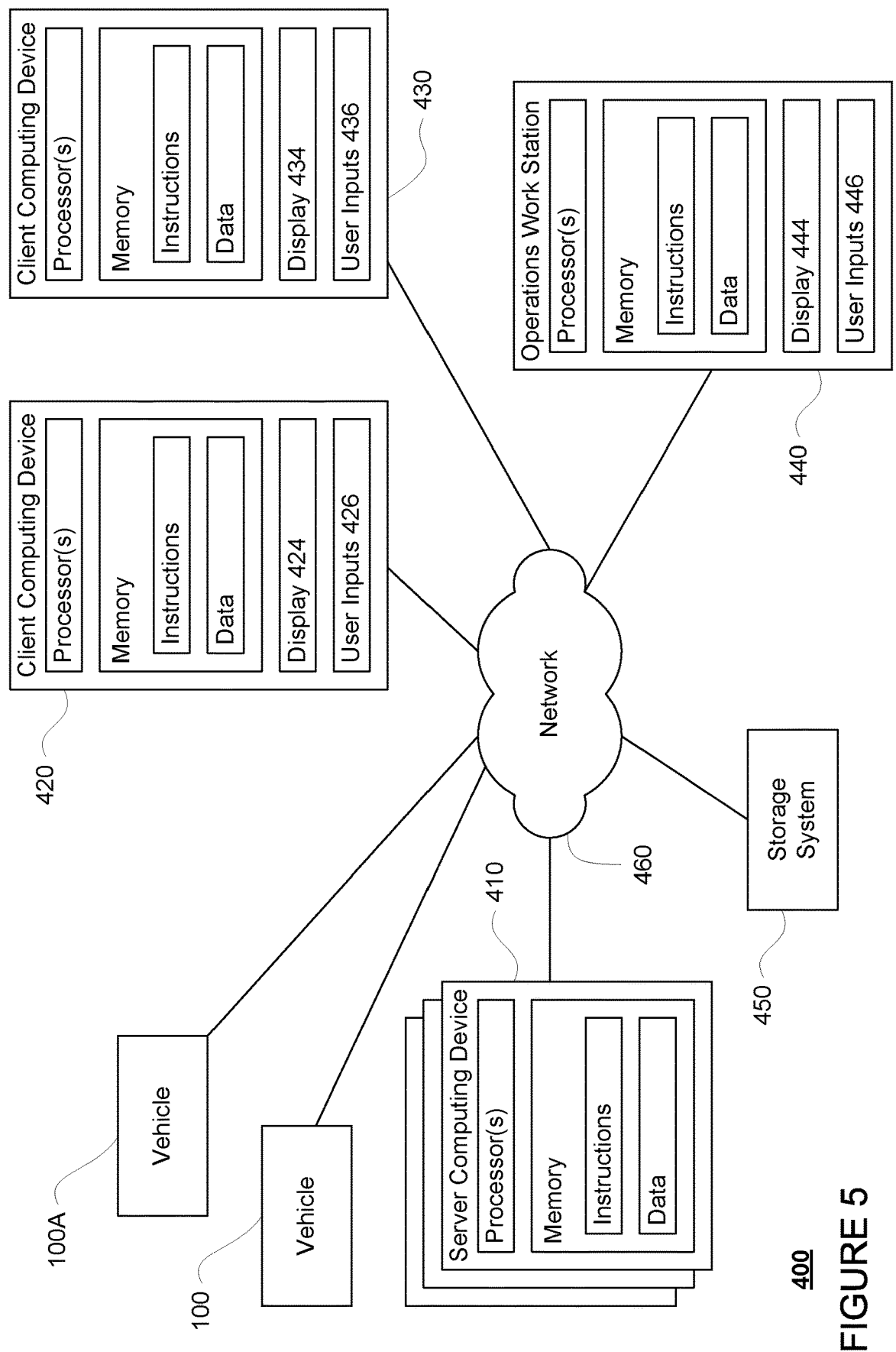
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge workstation used by an administrator or operator to communicate with passengers as discussed further below. Although only a single concierge workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information. For instance, the storage system 450 may also store the aforementioned autonomous vehicle control software which is to be used by vehicles, such as vehicle 100, to operate a vehicle in an autonomous driving mode. This autonomous vehicle control software stored in the storage system 450 include various invalidated and validated versions of the autonomous vehicle control software. Once validated, the autonomous vehicle control software may be sent, for instance, to memory 130 of vehicle 100 in order to be used by computing devices of the vehicle in order to control the vehicle in an autonomous driving mode.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include, for instance, sensor data generated by a perception system, such as the perception system 172 of vehicle 100. The perception system may include a plurality of sensors that generate sensor data. As an example, the sensor data may include raw sensor data as well as data identifying defining characteristics of perceived objects (including other road users) such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle 100, actual locations of the vehicles at different times, actual orientations/headings of the vehicle at different times, actual speeds, accelerations and decelerations of the vehicle at different times (and/or changes in speed, orientation/heading/steering angle, acceleration, etc. over time), classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation.

At least some of this log data may be "ride data," that is, log data generated during a particular trip or ride taken by a passenger in an autonomous vehicle such as vehicle 100. Ride data may include all of the aforementioned features of the log data or may include only specific types of data such as motion planning commands from a vehicle's planner system (such as planner system 160), telemetry from the vehicle, context from the map information used to control the vehicle, processed or raw sensor data for other road users (such as vehicles, bicyclists, pedestrians, etc.) from the vehicle's perception system (such as perception system 172), acceleration information, jerk (or the derivative of acceleration) information, etc. Ride data may also be associated with ride feedback provided by one or more passengers for a particular ride. At least some of this feedback may be provided by a passenger in response to, for instance during or immediately after, an unpleasant event as discussed further below. In addition or alternatively, the feedback may include an overall ride quality value after a ride has been completed as discussed further blow.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting transportation or ride services, or rather a vehicle, to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop. The one or more server computing devices 410 may then dispatch a vehicle to pick up the passenger at the pickup location, transport the passenger (i.e. make a "trip" or "ride") to the destination location, and drop off the passenger at the destination location.

Figure 6:
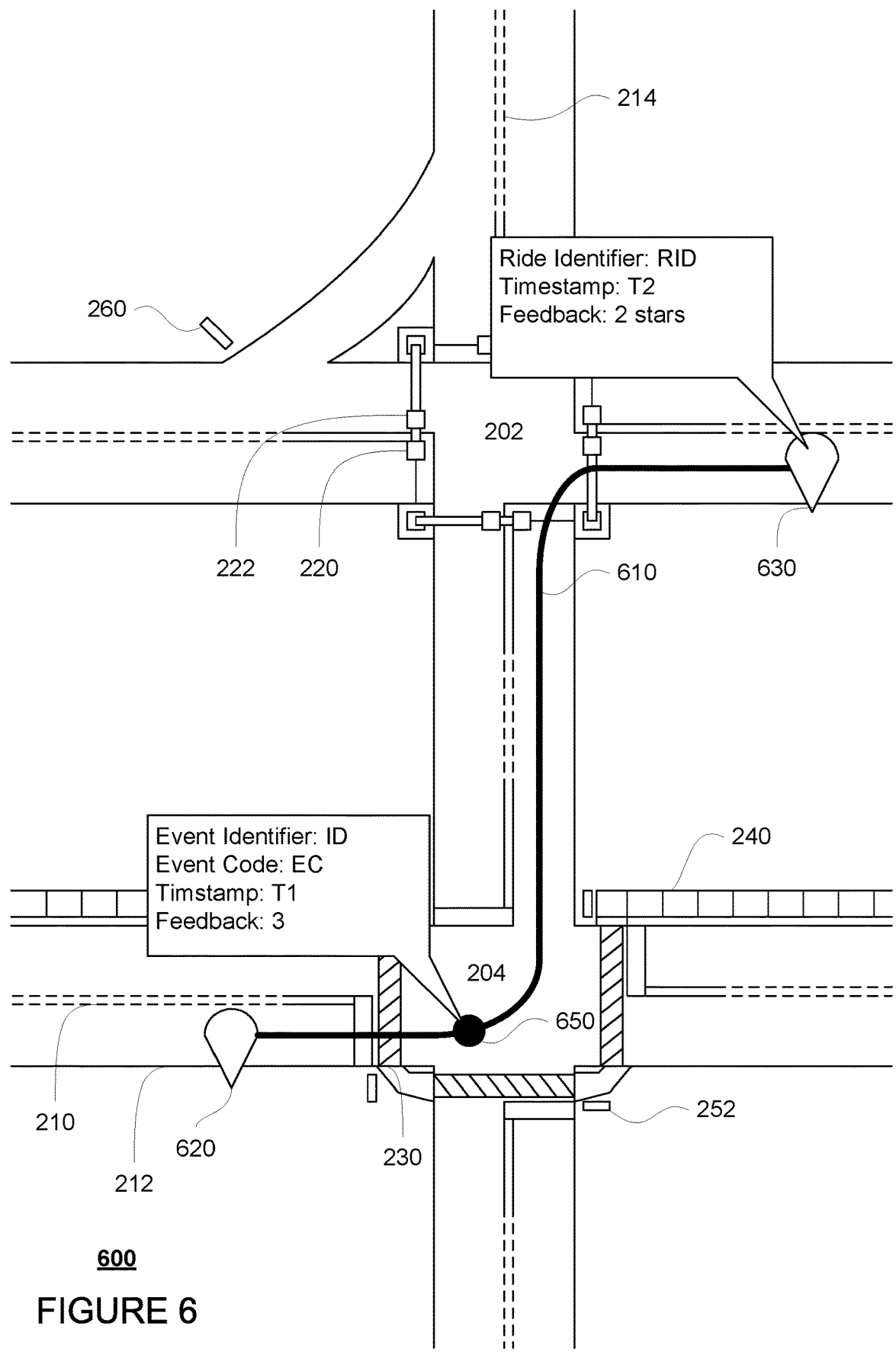
FIG. 6 is an example representation of a driving situation in accordance with aspects of the disclosure.

FIG. 6 represents ride data 600 for a ride by a passenger, such as user 422 or 432, in a vehicle having an autonomous driving mod such as vehicle 100. In this example, the vehicle may have followed a route 610 from a pick up location 620 to a destination location 630. Although not represented, this ride data 600 may also include the aforementioned log data including sensor data generated by a perception system (e.g., perception system 172), event data identifying different types of events such as collisions or near collisions with other objects, planned trajectories describing a planned geometry and/or speed for a potential path of the vehicle 100, actual locations of the vehicles at different times, actual orientations/headings of the vehicle at different times, actual speeds, accelerations and decelerations of the vehicle at different times (and/or changes in speed, orientation/heading/steering angle, acceleration, etc. over time), classifications of and responses to perceived objects, behavior predictions of perceived objects, status of various systems (e.g., acceleration, deceleration, perception, steering, signaling, routing, power, etc.) of the vehicle at different times including logged errors, inputs to and outputs of the various systems of the vehicle at different times, etc. This information, as well as feedback from the user 422, 432 discussed further below, may be used to train one or more models as discussed further below.

Figure 7:
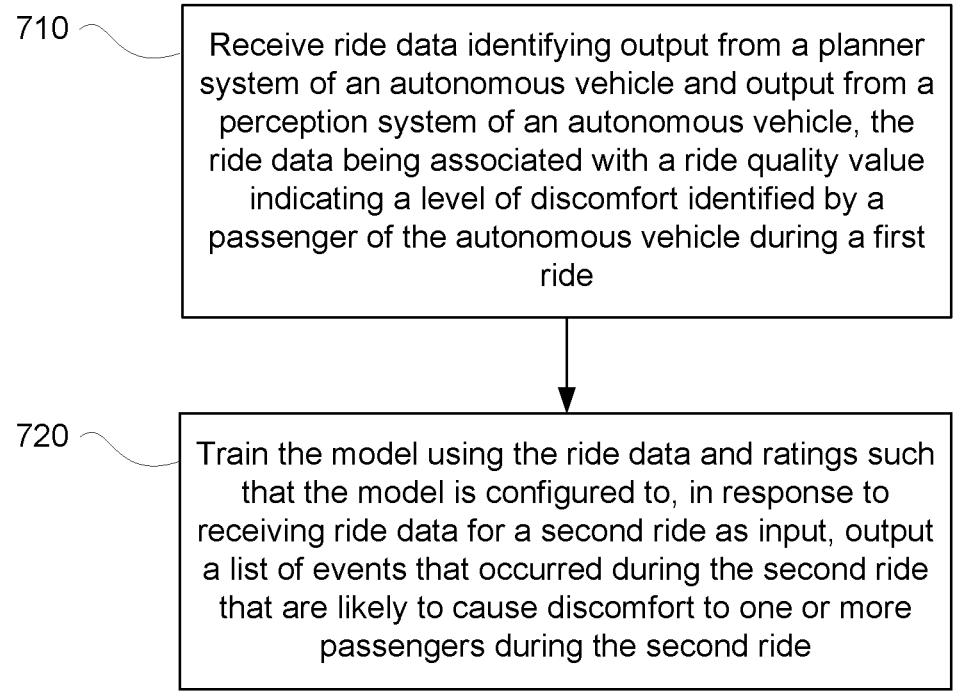
FIG. 7 is an example flow diagram in accordance with aspects of the disclosure.

FIG. 7 includes an example flow diagram 700 of some of the examples for training a model for identification of events likely to cause discomfort to passengers of autonomous vehicles, which may be performed by one or more processors such as processors of computing devices 410. In order to train the models, data must first be collected regarding ride quality and stored in storage system 450 as discussed above.

Figure 8A:
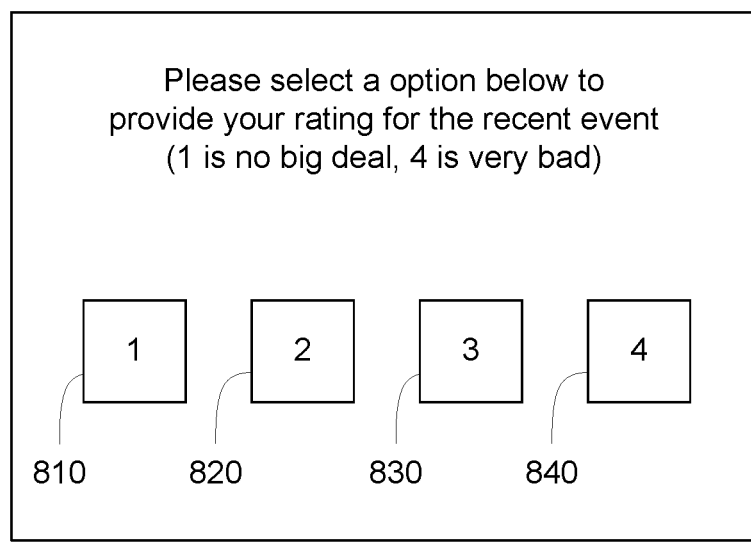
FIGS. 8A and 8B are example interfaces for providing passenger feedback in accordance with aspects of the disclosure.

For instance, during rides with human riders, such as actual passengers or test riders, these riders may be provided with the ability to provide real time feedback about a ride. As an example, test riders may provide real-time feedback during or immediately after an unpleasant event. FIG. 8A provides a user interface 800 for providing real-time feedback during a ride. User interface 800 includes a plurality of virtual (for instance presented on a touch screen display, such as internal electronic display 152 as shown in FIG. 8A or a display of a client computing device such as display 424 of client computing device 420 or display 434 of client computing device 430) or actual, physical buttons located in the vehicle. Each button 810, 820, 830, 840 includes a corresponding rating value: "1", "2", "3", "4", respectively. These values may indicate a level of discomfort, for instance on a range of 1 to 4, wherein 1 represents a very low or mild level of discomfort and 4 represents a very high or intense level of discomfort. Alternatively, rather than simply using numerical rating values, the rating values may be static or animated icons, for instance faces, which represent an emotional state of the passenger.

During or immediately after an unpleasant event, a passenger may provide the computing devices 110 with real-time feedback about the ride by selecting a rating, for instance using his or her finger to tap on the display or to press one of the physical buttons. For instance, returning to FIG. 6, a passenger (for instance, user 422, 432) may have provided feedback at point 650 along route 610. As shown, this feedback may indicate a rating value of "3" provided by the passenger representing a fairly high level of discomfort. This information may also be associated with an identifier (ID) and a timestamp (T1).

This feedback or rating value may also be converted to some other normalized value (for instance, on a scale of 0 to 1) representative of a level of discomfort for the corresponding event. The rating may also be associated with the ride data for the ride, for instance the ride data 600, including output from various systems of the vehicle as discussed above proximate to the time of the input and/or for the entire ride.

The ride data and associated feedback for a particular ride may be sent by the client computing device and/or computing devices 110 to the server computing devices 410, for instance via network 460 and/or by otherwise transferring the information to the server computing devices 410. The server computing devices 410 may store the ride data and associated feedback in storage system 450.

At the end of a ride, the same or similar interface may be used to provide feedback indicating an overall ride quality value after a ride has been completed. In this regard, the values of buttons 1, 2, 3, and 4 may be "inverted" or represent some value of stars on a scale of 1 to 4, wherein 1 represents a very low quality ride and 4 represents a very high quality ride. While the aforementioned interface 800 within the vehicle may be used, alternatively, a similar arrangement of virtual buttons may be surfaced on the display of the passenger's client computing device after a ride has completed.

Figure 8B:
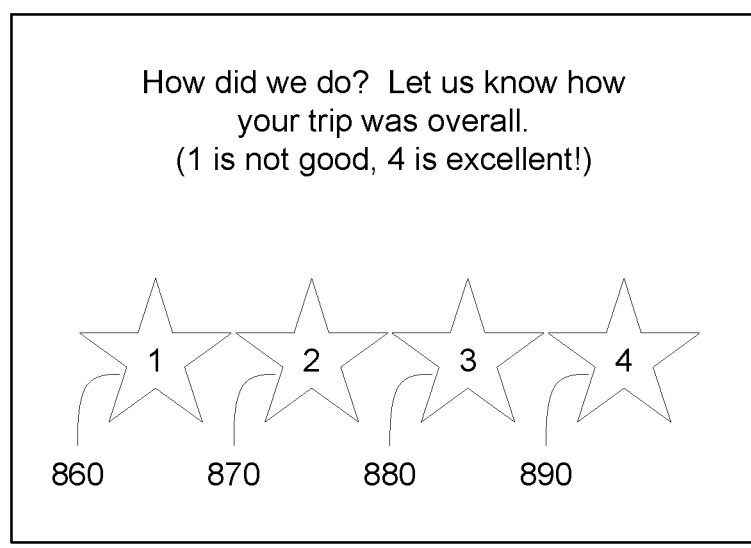

For example, FIG. 8B provides a user interface 850 for providing feedback after a ride. User interface 800 includes a plurality of virtual (for instance presented on a touch screen display, such as internal electronic display 152 as shown in FIG. 8A or a display of a client computing device such as display 422 of client computing device 120) or actual, physical buttons located in the vehicle. Each button 860, 870, 880, 890 includes a corresponding star-rating value: "1", "2", "3", "4", respectively. These star-rating values may indicate an overall level of satisfaction with the completed ride, where 1 represents very low satisfaction or low overall ride quality and 4 represents very high satisfaction or high overall ride quality. For example, a passenger can indicate the star-rating value by highlighting a given number of stars of a maximum number of stars (i.e. 3 of 4 stars would result in a 3-star rating value) or by simply tapping on a star representative of a particular value (i.e. the "3" star would result in a 3-star rating value). For instance, returning to FIG. 6, a passenger (for instance, user 432) may have provided feedback once the vehicle has completed the ride along route 610. As shown, this feedback may indicate an overall ride quality value of 2 stars provided by the passenger representing a fairly low overall ride quality. This feedback may also be associated with a ride identifier (RID) and a timestamp (T2). Again, the star-rating value may also be converted to some other normalized value (for instance, on a scale of 0 to 1, where zero is very low ride quality and 1 is very high ride quality), representative of overall ride quality for a given ride. Of course, the scale could also be inverted such that 1 is a very low quality ride and 0 is a very high quality ride. Again, alternatively, rather than simply using numerical rating values, the rating values may be static or animated icons, for instance faces, which represent an emotional state of the passenger.

The client computing device (via the application) may then automatically send this star-rating value and/or the normalized value to the server computing devices 410 and/or computing devices 110. The computing devices 110 may also provide the aforementioned ride data to the server computing devices 110, for instance via network 460 and/or other transfer, to be associated with the overall ride quality value provided by the passenger. All of this information may then be stored in storage system 450.

In order to train a first model, the server computing devices 210 may receive the ride data as well as the feedback from the storage system 450 as shown in block 710 of FIG. 7. In this instance, the feedback may include a ride quality value indicating a level of discomfort identified by a rider of the autonomous vehicle during a first ride. As noted above, this ride quality value may indicate a passenger's level of discomfort during an event that occurred during a particular ride.

The first model may be trained using the ride data and ride quality values such that the model is configured to, in response to receiving ride data for a second ride as input, output a list of events likely to cause discomfort to a passenger during the second ride as shown in block 720 of FIG. 7. The training data may also include the aforementioned event codes. In this regard, the ride data may be used as training input, and the event codes and ride quality values may be used as training output. The more information (i.e. ride data and feedback) used to train the model, the better the model may be expected to predict events likely to cause discomfort. In this regard, the first model may be trained using the ride data and associated level of discomfort for a plurality of rides by test riders in order to identify events uncomfortable for riders as well as a level of such discomfort. Again, the level of discomfort may correspond to a value on the aforementioned normalized scale. The model may include any type of machine learning model, such as neural nets, deep neural nets, a convolutional neural net over time, a recurrent neural net, etc. Alternatively, other non-machine learning models may be used. For example, if a vehicle is crossing an intersection during a yellow light, tracking the amount of time spent in that intersection while the light is yellow may be used as a measure of comfort in some sense.

In some instances, rather than being a single model, the first model may actually be a collection or conglomeration of different models that can be used alone or together to predict different types of events. Each of these different models may be used to identify a certain event code or group (e.g. category) of event codes. For instance, different models may be used to classify events or rather, to identify event codes, for different types of behaviors likely to cause discomfort. As an example, the first model may include a model for detecting situations in which a vehicle is swerving and providing an event code associated with swerving. Similarly, the first model also may include a model for detecting situations in which the vehicle is braking, driving too slowly given the context that a vehicle is currently located in (e.g., going 30 mph on a highway when other vehicles are going 55 mph or above), taking turns at high speeds, coming too close to another object without braking hard, etc.

The first model may then be used to detect uncomfortable events from ride data for different rides. For instance, the autonomous control vehicle software used to control the vehicle can be tested by generating simulations, for instance from log data from prior real-world driving situations. The output of the simulations may include ride data such only specific types of data such as motion planning commands from the vehicle's planner system (or rather, planner system software module), telemetry from the vehicle, context from the map information used to control the vehicle, processed or raw sensor data for other road users from the vehicle's perception system (or rather, perception system software module), acceleration information, jerk information, etc. The simulation ride data may be input into the first model in order to analyze ride data generated by the autonomous vehicle control software, and provide a list of events and a level of discomfort for each event. As such, the first model can provide ride quality for a given simulation or a plurality of simulations.

Figure 9:
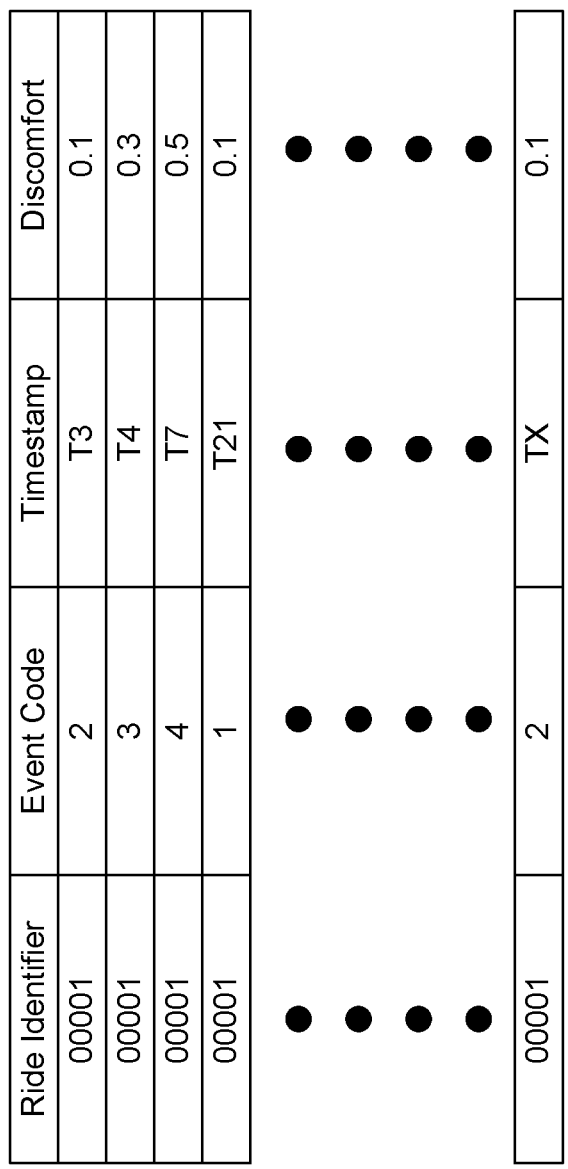
FIG. 9 is an example of output of a model in accordance with aspects of the disclosure.

FIG. 9 provides an example 900 of output for the first model for a given ride or simulated ride. Example 900 provides output for a ride or simulation identified by a ride identifier "00001". The ride identifier and timestamps can be used to identify when and in which simulation or ride an event occurred. As such, the output also includes a list of event codes which can be used to identify a certain type of event or maneuver such as a left turn, right turn, hard braking event, etc. that occurred during the ride or simulation and a level of discomfort corresponding to a value on the aforementioned normalized scale.

From this information, the first model may be used to assess ride quality for different versions of autonomous vehicle control software. For instance, the output of the first model may be used to identify particular types of events caused by a given version of the autonomous vehicle control software that are likely to be uncomfortable to a passenger or rather, those that correspond to relatively high level of discomfort (i.e. closer to 1 on the aforementioned normalized scale). This output may then be flagged for review depending upon list of events and the levels of discomfort. For instance, referring to example 900, the event at timestamp T7 and/or the ride identifier 00001 may be flagged for further review given the level of discomfort of 0.5 may be considered relatively high.

This in turn, can be used to make adjustments to the software in order to improve ride quality over all, for instance, by reducing the number of such particular types of events caused by the autonomous vehicle control software during future rides. As an example, engineers may prioritize reprogramming the autonomous vehicle control software in order to reduce the types of events having the highest level of discomfort. As another example, engineers may prioritize reprogramming the autonomous vehicle control software in order to reduce the number of a given type of event having a relatively high likelihood of occurrence even if the given type of event has a lower level of discomfort. In addition or alternatively, the autonomous vehicle control software may be reprogrammed in order to "replace" the events, for instance certain types of maneuvers, having high levels of discomfort with other types of events or certain types of maneuvers having lower levels of discomfort.

The first model may also be used to detect uncomfortable events from ride data for certain real-world rides. For instance, as noted above a passenger may provide an overall ride quality value after a ride has been completed. Again, as noted above, this may include a rating, such as 1 to 4 stars, etc. For rides below certain threshold values, for instance, 2 stars or below, the first model may automatically be used to detect uncomfortable events that occurred during the ride in order to avoid such events in the future for the particular passenger that provided the low overall ride quality value (or rather, star-rating value). In addition, this information can also be used to make adjustments to the software in order to improve ride quality over all as discussed above with regard to the simulated rides as well as to potentially identify patterns of discomfort specific to certain locations and times of day which may be used to avoid driving in those locations (e.g. on certain routes) at those times of day in order to improve comfort.

Figure 10:
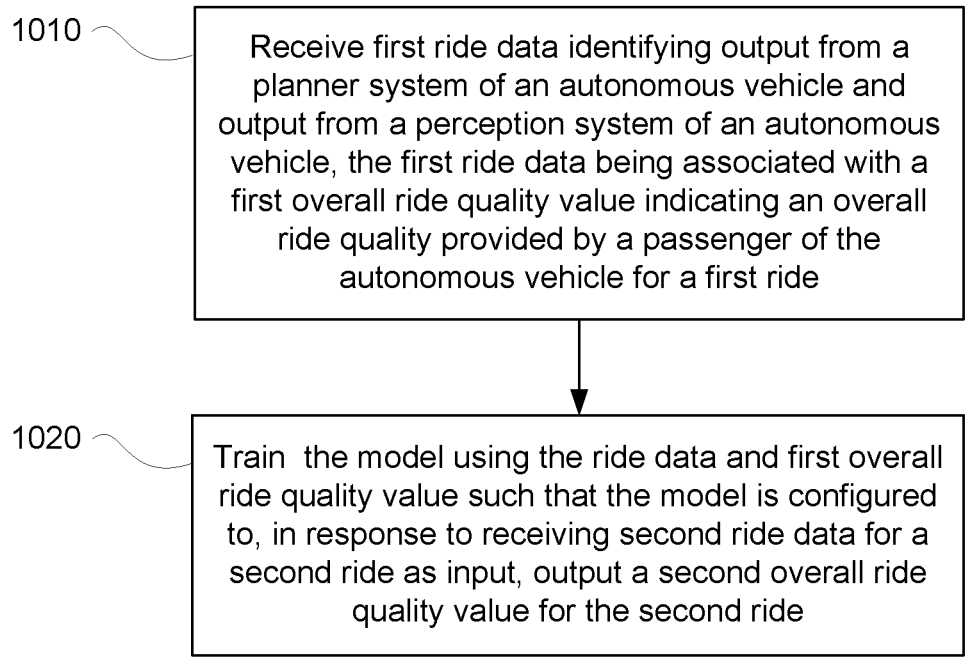
FIG. 10 is an example flow diagram in accordance with aspects of the disclosure.

FIG. 10 includes an example flow diagram 1000 of some of the examples for training a model for assessment of overall ride quality of autonomous vehicle rides, which may be performed by one or more processors such as processors of computing devices 410. As shown in block 1010, first ride data identifying output from a planner system of an autonomous vehicle and output from a perception system of an autonomous vehicle is received. The first ride data is associated with a first overall ride quality value indicating an overall ride quality by a rider of the autonomous vehicle during a first ride. For instance, the server computing devices 410 may retrieve ride data and associated feedback, here overall ride quality values and/or star-ratings values, from the storage system 450.

The second model may be trained using the ride data and first overall ride quality value such that the model is configured to, in response to receiving second ride data for a second ride as input, output a second overall ride quality value for the second ride as shown in block 1020. For instance, a second model may be trained using the star-rating values and associated ride data for a plurality of rides by passengers in order to identify an overall ride quality value. As noted above, the star-rating values may be converted to some other normalized value to represent overall ride quality and associated with the ride data for the ride. In addition, to better inform the second model, the output of the first model, identifying uncomfortable events during a ride (for which ride data is used to train the model) may also be used to train the second model. In this regard, the output of the first model and/or the ride data may be used as training inputs, and the overall ride quality values may be used as training output. Again, the more information (i.e. ride data and feedback) used to train the second model, the better the second model may be expected to predict overall ride quality values.

The second model may include any type of machine learning model, such as neural nets, deep neural nets, a convolutional neural net over time, a recurrent neural net, etc. In this case, by using a convolutional neural net over time, this may allow the second model to recognize relationships between events, when they occur during a ride, and how that affects the overall ride quality. For instance, if an uncomfortable event occurs at the beginning or the end of a ride, this may have a greater effect on the overall ride quality than if the same event were to occur during the middle of a ride.

The second model may also be trained using additional information from passengers. For instance, after experiencing a low quality ride, some passengers may no longer take rides. As such, this information may be used to train the model in order to predict how likely a passenger is to continue using the service. For passengers that are predicted to be likely to leave, the first model may be used to identify any uncomfortable events during that's passenger's ride or rides and in the future, vehicles may be controlled in order to avoid those events for that particular passenger. Again, whether a passenger is likely to stop using the service may be based on a normalized value (for instance, on a scale of 0 to 1, where zero is very low likelihood of stopping using the service and 1 is very high likelihood of stopping using the service), representative of overall likelihood of a passenger stopping using the service.

As another instance, the second model may be trained using data identifying motion sickness estimations for a ride. For instance, motion sickness may be assessed for a ride based on lateral and forward acceleration, steering angles (and changes in steering angles over time), and/or jerk values. As an example, an interface similar to interface 800 of FIG. 8A may be used to indicate motion sickness during or immediately after a particular event. These values of the buttons 810, 820, 830, 840 may indicate a level of motion sickness, for instance on a range of 1 to 4, wherein 1 represents a very low or mild level of motion sickness and 4 represents a very high or intense level of motion sickness. During or immediately after an unpleasant event, a passenger may select, for instance using his or her finger and tapping on the display, or press one of the physical buttons in order to provide the computing devices 110 with real-time feedback about the ride. In this regard, the motion sickness assessment may be similar to the ride quality value discussed above. As such, the second model may also identify whether a ride was associated with a high motion sickness value. Again, the values may also be converted to some other normalized value (for instance, on a scale of 0 to 1, where zero is very low motion sickness and 1 is very high motion sickness), representative of an overall motion sickness value for a given ride. This may be achieved, for instance, by summing the values, taking an average, taking a moving average with exponential decay, etc.

Figure 11:
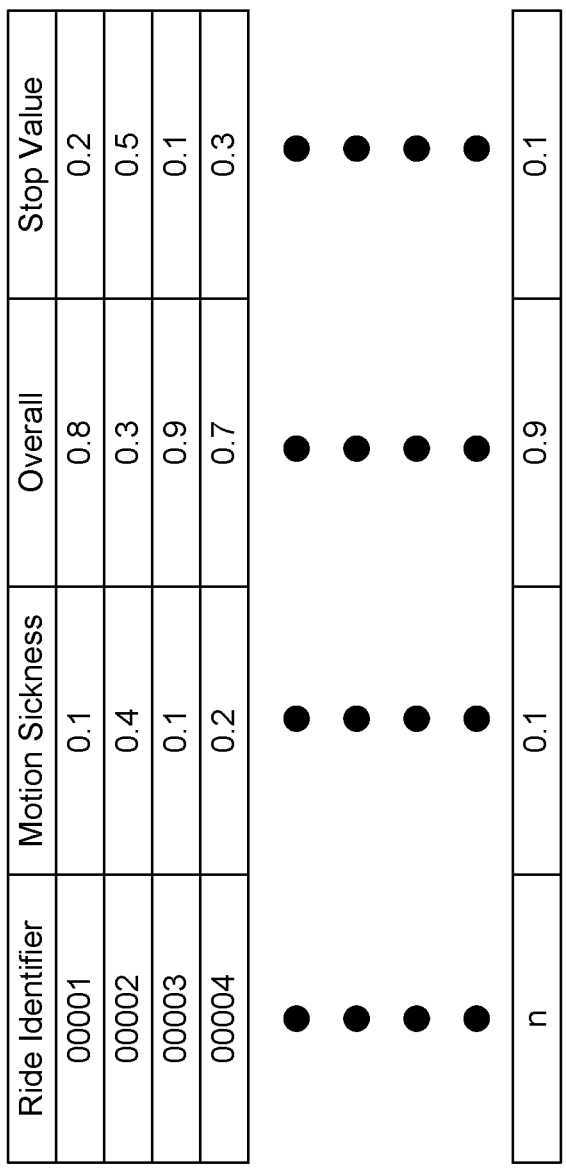
FIG. 11 is another example of output of a model in accordance with aspects of the disclosure.

FIG. 11 provides an example 1100 of output for the second model for a given ride or simulated ride. Example 1100 provides output for a plurality of rides or simulation identified by ride identifiers "00001" through "n". The output includes ride information identifying a ride identifier which can be used to identify which ride or ride simulation, a motion sickness value (motion sickness) representative of how likely a passenger is or was to experience motion sickness, an overall ride quality value (overall) corresponding to a value on the aforementioned normalized scale, and a likelihood value (stop value) indicative of how likely a passenger is to stop using the service after the ride. As shown, these values are all normalized on the aforementioned 0 to 1 scales.

The second model may also be used to determine overall ride quality for real-world and simulated rides. For instance, the second model may be used to assess what overall ride quality values are likely to cause loss of passengers. This output may then be flagged for review depending upon the overall ride quality values and/or likelihood of passengers stopping using the service. As an example, referring to example 1100, the ride identifier 00002 may be flagged for further review given the high motion sickness value (0.4), high likelihood of the passenger stopping using the service (0.5), and low overall ride quality value (0.3). In addition, the ride data for any rides having lower (i.e. closer to 0) overall ride quality values may be input into the first model as noted above in order to identify the specific events which are most likely to have an impact on overall ride quality.

This, in turn, may be used to prioritize engineering work to make adjustments to the software in order to improve ride quality over all. In addition, simulation ride data may be input into the second model in order to analyze ride data generated by the autonomous vehicle control software, and provide an overall ride quality value and/or a likelihood that a passenger will no longer use the service for the simulation. Output of the second model across many different simulations may be used to prioritize engineering work to make adjustments to the software in order to improve ride quality over all.

The overall ride quality values may be used to make assessments of the autonomous vehicle control software and/or service overall. For instance, given a number of miles driven, the output of the second model may be used to provide an estimate of overall ride quality for the service for a given period of time. In addition, the same data may be used to assess how certain types of maneuvers from the ride data, such as left turns, right turns, lane changes, highway merges, etc. affect overall ride quality values. Again, this information may be used to prioritize engineering work to make adjustments to the software in order to improve ride quality over all.

In addition to the aforementioned "offline" assessments, the first and second models may be provided to one or more vehicles in order to allow the computing devices of those vehicles to make better informed driving decisions. For instance, the first model and the second model may be sent to the computing devices 110 of vehicle 100, for instance via network 460, or by otherwise loading this information into the computing devices 110. This information may then be stored in the memory 130 of the computing devices 110 in order to allow the computing devices to use the first and second model to assess ride quality for a passenger, and essentially, how the passenger is feeling during a ride in order to provide some level of intervention if necessary.

For instance, the first model may be run in order to identify events that are likely to make a passenger feel uncomfortable. In response, the computing devices may take one or more intervention actions. This may include, for instance, changing aspects of the user interface to identify what the passenger is experiencing, connecting the passenger with a concierge (for instance to the user 442 operating concierge workstation 440) to speak with the passenger and allay any concerns, automatically changing the environment (for instance by playing positive or upbeat music and/or by displaying other information to entertain and distract the passenger), etc., and all in order to help the passenger relax.

For example, after an uncomfortable hard brake event, the first model may be used to determine a level of discomfort for the event. Ride data for the event, may be analyzed to identify the object that caused the event, for instance, another vehicle, a pedestrian, a bicyclist, a yellow light, etc. This information may then be used to generate a message explaining the situation, such as "We had to brake for the vehicle cutting in from the right just now, and sorry for the discomfort". The message may be communicated to the passenger audibly using speakers 154 and/or visually for instance, by displaying on the internal electronic display 152. This kind of communication may have the potential to reduce the passenger's negative experience.

For another instance, the second model may be run in order to determine how good or bad a particular ride is going for a passenger. Depending upon the data used to train the second model, this may essentially allow the computing devices 110 to assess the emotional state of the passenger, and depending on that emotional state (i.e. which overall rating the passenger is likely to give any given point during the ride), the computing devices may take any of the aforementioned one or more intervention actions.

Although the examples herein relate to gathering feedback by receiving explicit user input, such as described with respect to FIGS. 8A and 8B, feedback may be generated in other ways as well. For instance, cameras and/or biometric (e.g., skin) sensors may be used to monitor a passenger during a ride. Changes in the passenger's expression or biometric information may be used to estimate a corresponding a level of discomfort for a particular event, whether the passenger is experiencing motion sickness, and/or an overall level of satisfaction with the completed ride.

The features described herein may thus allow for the detection of uncomfortable events and assessment of overall ride quality both in real-world and simulated rides. This, in turn, allows for the prioritization of engineering work to make improvements to the autonomous vehicle control software, change ride behaviors in order to increase ridership retention and avoid loss of riders, as well as to provide for intervention when uncomfortable events occur.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of training a model for identification of events likely to cause discomfort to passengers of autonomous vehicles, the method comprising:
   receiving, by one or more server computing devices, first ride data identifying a first output from a planner system and a second output from a perception system, the first ride data being associated with a ride quality value indicating a level of discomfort identified by a passenger of an autonomous vehicle during a first ride, wherein the first ride data further includes information about locations and types of road users other than the autonomous vehicle; and
   training, by the one or more server computing devices, the model using the first ride data and any associated ride quality values such that the model is configured to, in response to receiving second ride data for a second ride as input, output a list of events that occur in the second ride that are likely to cause discomfort to one or more passengers during the second ride.

2. The method of claim 1, further comprising:
   inputting the second ride data for the second ride into the model in order to determine the list of events; and
   flagging the second ride data for review based on the list of events.

3. The method of claim 1, wherein the second ride data corresponds to simulated ride data for a simulated ride generated using autonomous vehicle control software.

4. The method of claim 1, wherein the ride quality value is further associated with a point in time during the first ride.

5. The method of claim 1, wherein the first ride data further includes context from a map used to control the autonomous vehicle during the first ride.

6. The method of claim 1, wherein the first ride data further includes acceleration information for the first ride.

7. The method of claim 6, wherein the first ride data further includes derivative of acceleration information for the autonomous vehicle for the first ride.

8. A method of training a model for assessment of overall ride quality of autonomous vehicle rides, the method comprising:
   receiving, by one or more server computing devices, first ride data identifying a first output from a planner system and a second output from, a perception system, the first ride data being associated with a first overall ride quality value indicating an overall ride quality provided by a passenger of an autonomous vehicle for a first ride, wherein the first ride data further includes information about locations and types, of road users other than the autonomous vehicle; and training, by the one or more server computing devices, the model using the first ride data and first overall ride quality value such that the model is configured to, in response to receiving second ride data for a second ride as input, output a second overall ride quality value for the second ride.

9. The method of claim 8, wherein the second ride data corresponds to simulated ride data for a simulated ride generated using autonomous vehicle control software.

10. The method of claim 8, wherein the first ride data further includes context from a map used to control the autonomous vehicle during the first ride.

11. The method of claim 8, wherein the first ride data further includes acceleration information for the autonomous vehicle.

12. The method of claim 8, further comprising receiving, output from a second model identifying a list of events likely to cause discomfort to a passenger during the first ride, and wherein the training is further based on the list of events.

13. The method of claim 8, farther comprising converting a first ride quality value to the first overall ride quality value, and the first ride quality value corresponds to a star rating for the first ride provided by the passenger.

14. The method of claim 8, wherein the model is a convolutional neural net over time in order to enable the model recognize relationships between events and when those events occur during a ride and how those relationships affect overall ride quality.

15. The method of claim 8, further comprising:
inputting the second ride data for the second ride into the model in order to determine the second overall ride quality value; and
flagging the second ride data for review based he second overallride quality value.

16. The method of claim 8, further comprising:
inputting the second ride data for the second ride into the model in order to determine the second overall ride quality value; and
using the second overall ride quality value to assess ride quality of a plurality of miles driven by autonomous vehicles.

17. The method of claim 8, further comprising:
inputting the second ride data for the second ride into the model in order to determine the second overall ride quality value; and
using the second overall ride quality value to assess ride quality of a certaintype of maneuver.

18. The method of claim 17, wherein the certain type of maneuver includes left or right turns.

19. The method of claim 17, wherein the certain type of maneuver includes lane changes.

* * * * *

UNITED STATES PATENT AND TRADEMARK OFFICE
CERTIFICATE OF CORRECTION

| | | |
|---|---|---|
| PATENT NO. | : 11,657,318 B2 | Page 1 of 1 |
| APPLICATION NO. | : 16/214991 | |
| DATED | : May 23, 2023 | |
| INVENTOR(S) | : Ioan-Alexandru Sucan et al. | |

It is certified that error appears in the above-identified patent and that said Letters Patent is hereby corrected as shown below:

In the Claims

Claim 13, Column 19, Line 27:
Now reads: "farther"; should read -- further --

Claim 15, Column 20, Line 10:
Now reads: "he"; should read -- the --

Claim 15, Column 20, Line 11:
Now reads: "overallride"; should read -- overall ride --

Claim 17, Column 20, Line 24:
Now reads: "certaintype"; should read -- certain type --

Signed and Sealed this
Twenty-seventh Day of June, 2023

Katherine Kelly Vidal
*Director of the United States Patent and Trademark Office*